(12) United States Patent  
Chen et al.

(10) Patent No.: US 7,555,206 B2  
(45) Date of Patent: Jun. 30, 2009

(54) APPARATUS FOR RETRIEVING DATA FROM DETACHABLE OPTICAL DRIVER

(76) Inventors: Hong-Chi Chen, No. 25, R&D II Road, Hsin-Chu Science-Based Industrial Park (TW); Cheng-Yeh Lin, No. 25, R&D II Road, Hsin-Chu Science-Based Industrial Park (TW); Hsueh-Chih Yang, No. 25, R&D II Road, Hsin-Chu Science-Based Industrial Park (TW); Jou-Wei Fu, No. 25, R&D II Road, Hsin-Chu Science-Based Industrial Park (TW)

( * ) Notice: Subject to any disclaimer, the term of this patent is extended or adjusted under 35 U.S.C. 154(b) by 715 days.

(21) Appl. No.: 10/840,225

(22) Filed: May 7, 2004

(65) Prior Publication Data

US 2005/0249066 A1 Nov. 10, 2005

(51) Int. Cl.
*H04N 5/00* (2006.01)
*H04N 9/79* (2006.01)
*H04K 1/00* (2006.01)
*H05K 1/14* (2006.01)
*H05K 5/00* (2006.01)
*G06F 3/00* (2006.01)
*G06F 13/38* (2006.01)
*G11B 21/08* (2006.01)
*G11B 27/22* (2006.01)
*H04N 7/26* (2006.01)

(52) U.S. Cl. .................. 386/126; 386/45; 386/112; 386/124; 386/125; 361/685; 361/742; 369/30.27; 369/47.36; 710/5; 710/8; 710/62; 710/72; 713/182

(58) Field of Classification Search ................. 386/126, 386/45, 112, 124, 125, E5.002; 369/30.27, 369/47.36; 348/E5.108; 361/685, 742; 375/E7.001; 710/5, 8, 62, 72; 713/182, 189; 720/735; 726/21

See application file for complete search history.

(56) References Cited

U.S. PATENT DOCUMENTS

| | | | | |
|---|---|---|---|---|
| 5,579,297 | A * | 11/1996 | Childers et al. | 720/735 |
| 6,150,925 | A * | 11/2000 | Casazza | 340/425.5 |
| 6,597,862 | B1 * | 7/2003 | Saeki et al. | 386/125 |
| 6,618,832 | B1 * | 9/2003 | Schweidler et al. | 714/776 |
| 6,767,253 | B1 * | 7/2004 | Werner et al. | 439/638 |
| 6,792,000 | B1 * | 9/2004 | Morinaga et al. | 370/473 |
| 6,871,239 | B2 * | 3/2005 | Tanaka | 710/8 |
| 6,941,387 | B1 * | 9/2005 | Takihara | 710/5 |
| 6,996,731 | B1 * | 2/2006 | Obitsu | 713/324 |
| 7,113,409 | B1 * | 9/2006 | Whitted | 361/804 |
| 2001/0016432 | A1 * | 8/2001 | Yamauchi et al. | 439/34 |
| 2001/0043799 | A1 * | 11/2001 | Okada et al. | 386/95 |
| 2003/0223736 | A1 * | 12/2003 | Muzaffer et al. | 386/125 |
| 2004/0264943 | A1 * | 12/2004 | Chen | 386/125 |

* cited by examiner

*Primary Examiner*—Thai Tran
*Assistant Examiner*—Syed Y Hasan
(74) *Attorney, Agent, or Firm*—Perkins Coie LLP

(57) ABSTRACT

A detachable optical driver includes a detachable box, a signal import and export device installed in the detachable box, a playing platform; and an encoding/decoding module connecting to and positioned inside the playing platform for being able to export said data to a display facility. The detachable optical driver is a modulized design by enhancing a media playing platform with detachable various functions, such as CD-ROM, CD-RW, DVD-ROM, DVD-RW, DVD-Dual and digital camcorder, home gateway, media database and so on. When the reading device of the optical drive malfunctions, only that malfunctioned reading device needs to be changed.

21 Claims, 2 Drawing Sheets

APPARATUS FOR RETRIEVING DATA FROM DETACHABLE OPTICAL DRIVER

BACKGROUND OF THE INVENTION

1. Field of the Invention

The present invention relates a platform of detachable media player. By a modulized design, the goal to play the different format optical data or media data can be reached by only stacking different reading devices.

2. Background Description

The prosperous development of digit content and information has brought the human being into the colorful media era. The digital content's multi-media data such as music, video, pictures, games and digital database etc. mostly requires a significant storage space; thus, it leads the fast development of the mass storage device. Although the fast development of the mass storage device provides the users a great convenience about the storage device; however, upon the varied storage formats, encoding ways, and read/write techniques, the different devices are with the different specifications. This causes a great inconvenience about the interflow of data; moreover, when the user is choosing the playing device, the user has to pick among those with the different specifications; then the one has been chosen is usually able to read the CD of single one format or of limited formats. Assume to read the CD or the storage device of another specification, it requires to use another playing device; it causes a great inconvenience use-wise. Additionally, for two different CD playing devices, besides the different read/write mechanisms, many of the rest components are duplicated. It also leads into the waste of resource. Therefore, the present invention offers a modulized design for the users who only need to switch the corresponding module and stack on the data playing platform in order to read the varied CDs or data storage formats, further to meet the advantages of economy, flexibility and upgradeability.

Traditionally, the known CD playing platform is able to read and play one CD format. Its benefits are low cost and easy application. However, being able to read only one CD format causes the limitation. In other words, it requires another player to read and write the optical compact disk, such as DVD or other format, and it's the significant waste of resource as well.

In order to improve the drawback of the playing platform as above, another known media player adopts the multi-function read/write device to read and play the CD with the various formats. Because of the expensive multi-function read/write device, it leads the high price of such player. Besides, what can play on such player is still limited, some specific players are still required for some specific formats. It's still not flexible use-wise. If the user would like to have the other format of optical compact disk being read, the user has to buy another compact disk player. Nonetheless, if the above-mentioned multi-function read/write device is broken or fails, the user seldom repairs it. Most likely, the user will buy a new one. In this case, it wastes money and resources since some common parts of the failed device are still same, workable or adoptable.

SUMMARY OF THE INVENTION

According to the above objects and to solve the known shortcomings like the inflexibility of player's specification, multi-function and the price, the present invention offers a modulized design for the users who only detach different reading devices upon the varied needs in order to meet the objects of the flexibility and multi-function.

In another object of the present invention, it is to mitigate the complexity of the optical data reading device and further to reduce its price.

In another object of the present invention, by applying the modulized design, when the reading drive of the platform is malfunctioned or needs to be upgraded, only the reading drive needs to be replaced and detached with another one; hence, it can save the cost from maintenance or upgrade.

According to the above objects, the present invention offers a platform of detachable media player, which includes: a detachable box; a signal import and export device installed in said detachable box; a playing platform for said detachable box being detached inside said playing platform; and a decoding module connecting to and positioned inside said playing platform for being able to export said data to a display facility.

In another aspect of the present invention, the signal import and export device is an optical reading and writing device and more specifically a DVD rewritable drive.

In yet another aspect of the present invention, the decoding module is a MPEG decoder and the display facility is a television.

Furthermore, the data accessed by the optical reading and writing device is stored in a storage device. The data is transmitted to and recorded in an optical disk by the optical reading and writing device.

In another aspect of the present invention, besides the way to pile up the detachable boxes and to get connected with the platform, the data reading drive also can be accessed through the common industrial transmission standards (as the interfaces of USB, IEEE 1394, IDE, SCSI, 802.3 or 802.11b) to get connected with the playing platform.

In another aspect of the present invention, in accord to the switch of the different data reading device, the encoding/decoding module can be filled in with the different one even can be copied with the different encoding/decoding programs upon requirements.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In order to provide a clear description and better understanding, charts/diagrams are not drawn in portion and relative scale. The size of some parts is also exaggerated compared in scale to other related parts. To be more concise, irrelative details are not drawn completely.

Figure 1:
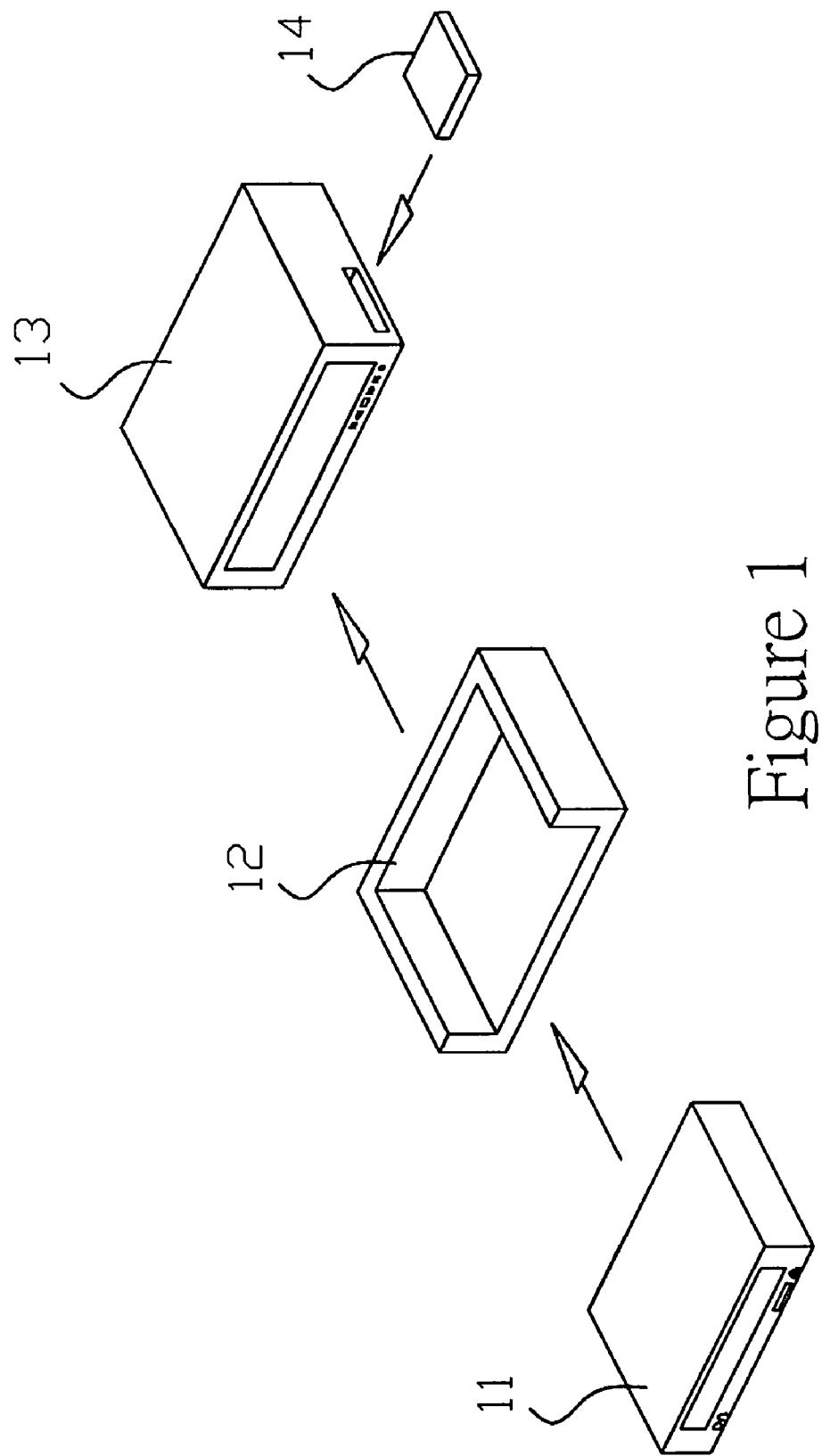
FIG. 1 illustrates the detachable way of the present invention.

Please refer to FIG. 1, a data read/write device 11 held by a detachable box 12 is connected with a playing device 13; and the data accessed by the data read/write device 11 is decoded by an encoding/decoding module 14 then is played by the playing device 13. Besides playing the data accessed by the data read/write device 13, via the encoding/decoding module 14, the playing device 13 also can encode the data into a certain data format. Then through the data read/write device 11, data is processed to copy and write into the particular CD or the storage media.

Figure 2:
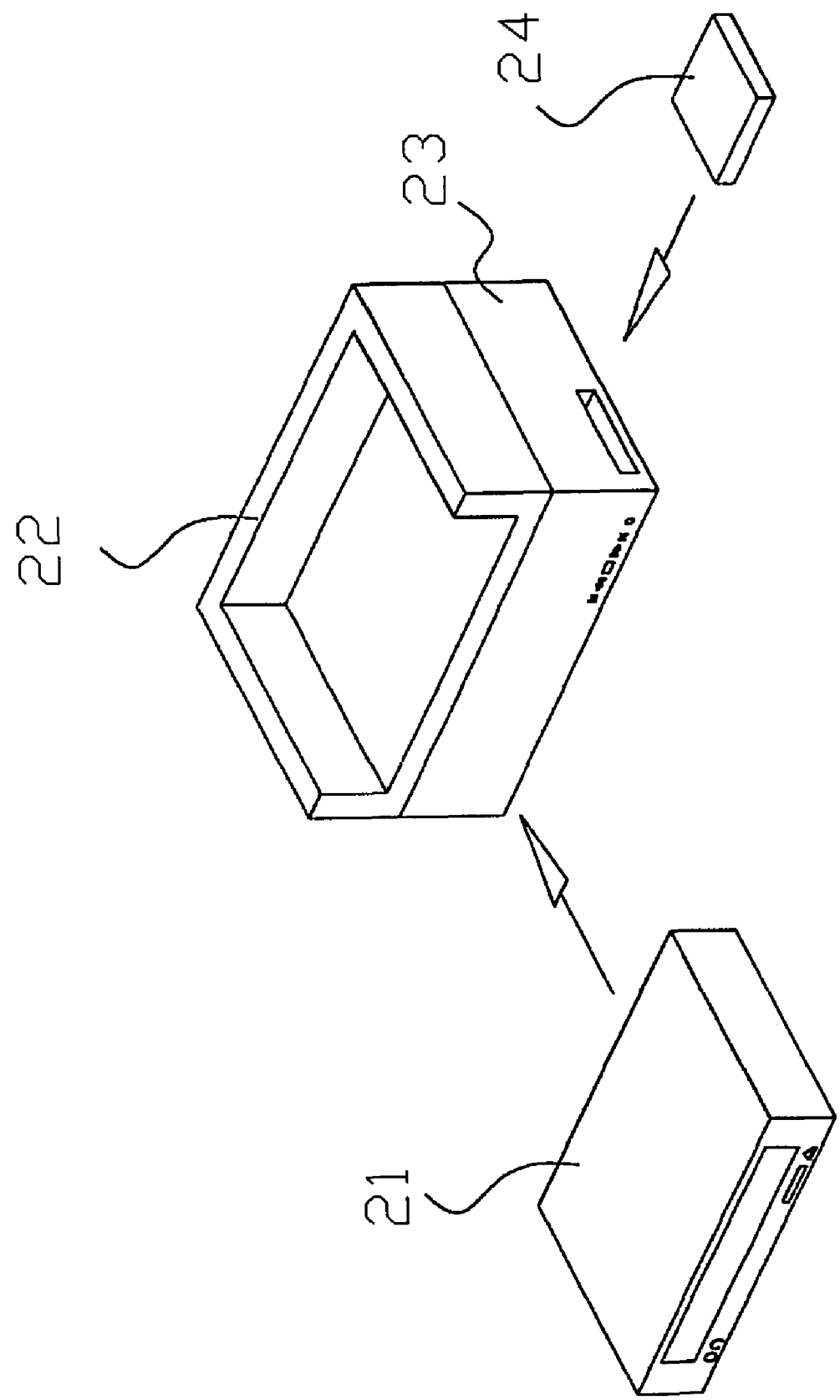
FIG. 2 is a schematic diagram showing the second embodiment of the present invention.

Accordingly, FIG. 2 shows a second embodiment of the present invention. The present invention can be implemented by combined detachable and stackable method: a data read/write device 21 held by a stackable box 22 is piled up on the top of a playing device 23; and the data accessed by the data read/write device 21 is decoded by an encoding/decoding module 24 and is played by the playing device 23. Besides playing the data accessed by the data read/write device 21, via utilization of the encoding/decoding module 24, the playing device 23 also can encode the data into a certain data format then through the data read/write device 21 to copy and write to the particular CD or the storage media.

In general, the present invention offers an detachable optical data storage playing device, which includes a data reading drive to read the data on CD; a detachable box to hold the data reading drive; a player to carry the detachable box and to connect with the data reading drive further to play the data accessed by the data reading drive; and an encoding/decoding module to provide the encoding/decoding programs required by the data reading drive. The data reading drive can also be a writing device; with the programs in the encoding/decoding module, the data played in the player is able to be encoded into the certain format and to write into a CD.

Plus, the data reading drive can also be a varied data format read/write drive such as CD-ROM, CD-RW, DVD-ROM, DVD-RW, DVD-Audio, SACD or HDD. Moreover, in accord to the switch of the different data read/write drive, the encoding/decoding module can be filled in with the different one or even can be copied with the different encoding/decoding programs upon requirements.

The data read/write device can just be hard disk for reading and writing data, such as media information thereon. The data is stored in the hard disk and can be transmitted to and recorded in an optical disk by an optical reading and writing device. If detachable boxes are piled up on the top of the paying device, data from the various sources can be simultaneously processed and further to play and to write back in an optical recorder or the hard drive.

For the description as above, a superior exemplary implementation, as the second embodiment shown in FIG. 2 includes: a data read/write device: to read the data stored in CD or to write in accordance with the certain format; a detachable box: to hold or to be stacked with the data read/write device; a playing device: to cradle the detachable box and to connect with the read/write device for playing the data accessed by the data read/write device; an encoding/decoding module: to provide the encoding/decoding programs required to play the data accessed by the data read/write device. Besides playing the data accessed by the read/write device, by utilizing the read/write device, the playing device can also copy the data and write into the specific CD or storage media. Furthermore, for more apparent illustration and easier apprehension of the present invention, the contents in the drawings are not drawn to the proportion, some measurements and the related scales have been exaggerated; also for the purpose of simplicity, some unconcerned parts are not completed in the drawings.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

The invention claimed is:

1. A modularized system for reading from and/or writing to optical media, the system comprising:
   a playing device configured to engage with two or more modular components;
   a first modular component configured to be slidably received by the playing device, the first modular component including a housing and an optical reading and/or writing device removably received within the housing, the reading and/or writing device being operably coupled with the playing device when the first modular component is engaged with the playing device; and
   a second modular component configured to be slidably received by the playing device, the second modular component having a memory that stores an encoding and/or decoding program operable by the playing device to write to and/or read from optical media at the first modular component.

2. The system of claim 1 wherein the optical reading and/or writing device includes a CD and/or DVD drive.

3. The system of claim 1 wherein the second modular component includes an MPEG encoder and/or decoder.

4. The system of claim 1 wherein the playing device outputs one or more signals decoded by the second modular component, the one or more signals being readable by an audio and/or video device operably coupled with the playing device.

5. The system of claim 1 wherein the first modular component engages with the playing device at a top side of the playing device.

6. The system of claim 1, further comprising a third modular component configured to engage with the first modular component in a stacked arrangement, wherein the third modular component is operably coupled with the playing device when stacked upon the first modular component.

7. The system of claim 1 wherein the first modular component is operably coupled with the playing device via an IEEE 1394 based communication link.

8. The system of claim 1 wherein the first modular component is operably coupled with the playing device via a universal serial bus (USB) link.

9. The system of claim 1 wherein the first modular component is operably coupled with the playing device via an 802.11 wireless communication link.

10. The system of claim 1 wherein the first modular component is operably coupled with the playing device via an IDE or SCSI link.

11. A modularized device for reading from and/or writing to optical media, the device comprising:
    a first modular component including a housing means and means for optically reading from and/or writing to optical media, the means for optically reading and/or writing being removably received within the housing means;
    a second modular component including means for storing an encoding and/or decoding program; and
    a playing unit configured to slidably receive the first and second modular components, the playing unit operably coupling the means for optically reading and/or writing with the means for storing the encoding and/or decoding program when engaged with the first and second modular components.

12. The device of claim 11 wherein the first and second modular components are configured to read from and/or write to the optical media in a data format that includes at least one of CD-ROM, CD-RW, DVD-ROM, DVD-RW, DVD-Audio, and SACD.

13. The device of claim 11 wherein the means for optically reading and/or writing comprises a first means for optically reading and/or writing, and wherein the device further comprises a third modular component including a second means for optically reading and/or writing operably coupled with the means for storing the encoding and/or decoding program when the playing unit is engaged with the second and third modular components.

14. The device of claim 11 wherein the means for storing the encoding and/or decoding program comprises a first means for storing the encoding and/or decoding program, and wherein the device further comprises a third modular component including a second means for storing the encoding and/or decoding program operably coupled with the means for optically reading and/or writing when the playing unit is engaged with the first and third modular components.

15. A media player, comprising:
   a playing device;
   a housing configured to be slidably installed with and uninstalled from the playing device;
   a data read/write device configured to be removably received in the housing, wherein the data read/write device is operably coupled with the playing device when the housing is engaged with the playing device; and
   an encoding/decoding device configured to be slidably installed with and uninstalled from the playing device, wherein the encoding/decoding device includes a memory storing an encoding and/or decoding program that enables the playing device to play data accessed by the data read/write device.

16. The media player of claim 15 wherein the data read/write device includes a DVD drive and/or CD drive configured to read from and/or write to optical media.

17. The media player of claim 15 wherein the data read/write device includes a hard disk drive having media data stored thereon.

18. The media player of claim 15 wherein the encoding/decoding device is a first encoding/decoding device having a first encoding and/or decoding program that enables the playing device to play first data accessed by the data read/write device, and wherein the media player further comprises:
   a second encoding/decoding device configured to be slidably received by the playing device after uninstalling the first encoding/decoding device, the second encoding/decoding device including a memory storing a second encoding and/or decoding program that enables the playing device to play second data accessed by the data read/write device, wherein the second data is different than the first data.

19. The media player of claim 15 wherein the data read/write device and encoding/decoding device are configured to read from and/or write to optical media in a data format that includes at least one of CD-ROM, CD-RW, DVD-ROM, DVD-RW, DVD-Audio, and SACD.

20. The media player of claim 15 wherein the encoding/decoding device includes an MPEG encoder and/or decoder.

21. The media player of claim 15 wherein the playing device is configured to output one or more signals decoded by the encoding/decoding device, and wherein the one or more signals are readable by an audio and/or video device communication with the playing device.

* * * * *